June 22, 1943.       G. A. HIGHBERG ET AL       2,322,440
CHUCK OPERATING MECHANISM
Filed Nov. 18, 1940
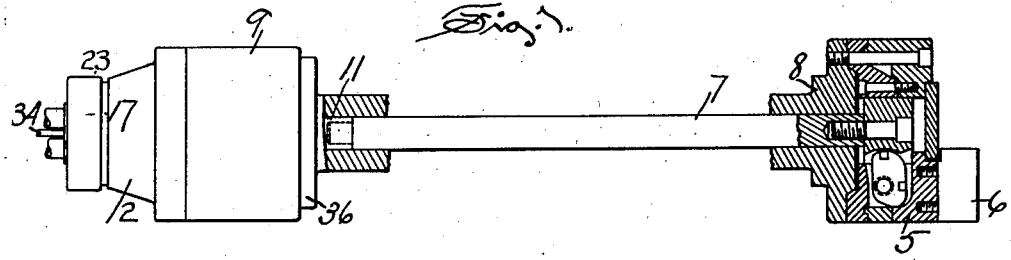
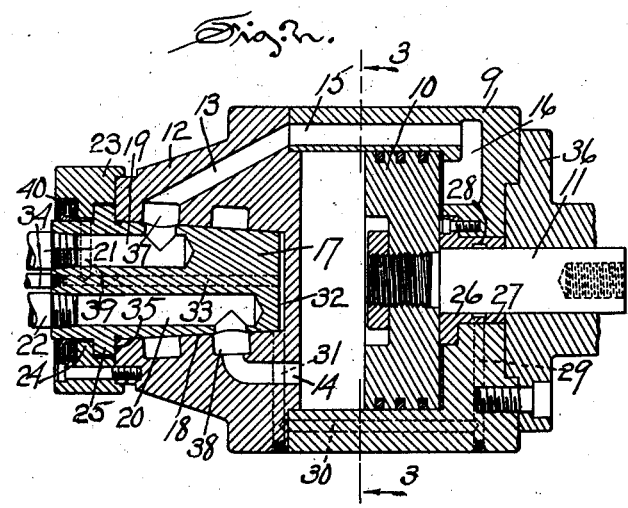 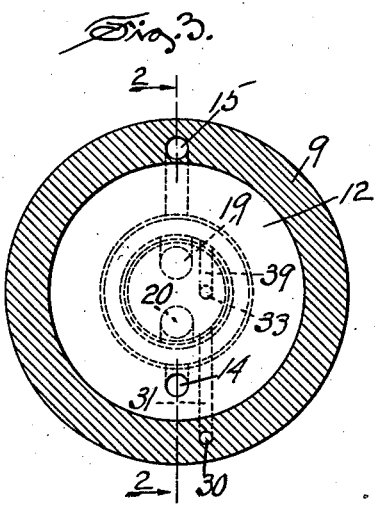
INVENTORS
George A. Highberg.
Herbert Hickey.
By Arthur B. Jenkins,
ATTORNEY Patented June 22, 1943

2,322,440

UNITED STATES PATENT OFFICE 2,322,440

CHUCK OPERATING MECHANISM

George A. Highberg, West Hartford, and Herbert Hickey, Hartford, Conn., assignors to The Cushman Chuck Company, Hartford, Conn., a corporation of Connecticut Application November 18, 1940, Serial No. 366,118

5 Claims. (Cl. 121—38)

Our invention relates to the class of devices which are employed for operating the chuck jaws of chucks used to clamp and hold pieces of work while being operated upon by cutting and similar tools, and an object of the invention, among others, is the production of a mechanism of this type of simple and durable construction, operating in a most effective manner to produce the results required of it and one in which the wear between moving parts may be readily taken up, thereby indefinitely extending the period of usefulness of the mechanism.

One form of a mechanism embodying our invention and in the construction and use of which the objects herein set out, as well as others, may be attained, is illustrated in the accompanying drawing, in which—

Figure 1 is a side view of a chuck and of our improved operating mechanism therefor, the chuck being shown in section.

Figure 2 is a view on enlarged scale in section through our improved chuck operating mechanism on a plane denoted by the broken line 2—2 of Figure 3.

Figure 3 is a view in section on a plane denoted by the dotted line 3—3 of Figure 2.

In the accompanying drawing the numeral 5 denotes the body of a chuck of ordinary and well known construction having chuck jaws 6 radially movable thereon by means of a draw bar 7 passing through a back plate 8 comprising a portion of the chuck and connected with the jaws 6 for operating them in a manner well known and for which reason a further and detailed description is omitted herein.

The numeral 9 denotes the cylinder of our improved chuck operating mechanism which contains a piston 10 having a stem 11 secured to the draw bar 7 as by means of interengaging screw threads and in a manner common to such structures. The cylinder is closed by a head 12 secured in place, as by means of screw bolts in a manner common to such structures. Inlet and exhaust passages 13 and 14 lead into the cylinder upon opposite sides of the piston 10 for the exhaust and supply of fluid under pressure to opposite sides of the piston to impart reciprocating movement thereto, the passage 13 communicating with a passage 15 in the wall of the cylinder extending to a branch 16 opening into the chamber in the cylinder in the rear of the piston.

A plug 17 is fitted in a recess 18 in the head 12, this plug having inlet and exhaust passages 19—20 for the supply of fluid under pressure as through tubes 21—22 fitting screw threaded openings in the end of the plug 17, as shown in Figure 2 of the drawing. The passages 19 and 20 open respectively into the passages 13 and 14, each of said passages 13—14 and 19—20 constituting both supply and exhaust passages.

A cap 23 is secured to the outer end of the head 12, this cap having a lip 24 engaging a flange 25 on the plug 17 to retain the latter in place.

A bushing 26 is secured in an opening 27 extending through the bottom of the cylinder, this bushing having an annular recess 28 surrounding the draw bar to intercept any liquid passing along the draw bar as the effect of pressure within the chamber in the cylinder. A duct comprising branches 29—30—31 extends from the recess 28 into a space 32 underneath the inner end of the plug 17, and a duct 33 extends from said space through the plug to the outer end thereof where it passes off through a tube 34 to a source of supply thereby removing any excess liquid within the cylinder caused by pressure therein. Annular recesses 37—38 are formed in the wall of the recess 18 in communication respectively with the inlet and exhaust passages 13 and 14 and also in communication respectively with the inlet and exhaust passages 19 and 20 in the plug 17.

A draining duct 39 extends into the plug from the side thereof near the flange 25 and into the duct 33 to drain off any oil which may accumulate at this point.

A material feature of the invention resides in the plug 17 which is tapered to fit the tapered recess 18 and the cap 23 seated against the end 35 of the head 12 and engaging the flange 25 on the plug. This end 35 of the head is flat forming a flat seat for the flat contacting surface of the cap 23 so that either of said flat surfaces may be readily ground off and thereby any wear which takes place between the plug 17 and the wall of the recess 18 in the head may be easily taken up to constantly maintain an accurate fit between the plug and its recess, simply by removing the cap and grinding off that face engaged with the seat 35.

Another important feature resides in the construction of the recess 28 with the ducts 29—30—31 and 33 leading from said recess thereby removing any liquid collected by the recess and preventing the seeping of such liquid along the stem 11 of the piston through the bottom of the cylinder and through the support 36 therefor.

In order to maintain the plug 17 free from sticking action in its recess 18, which might occur by reason of excessive force accidentally applied in an endwise direction to the plug care is taken to seat the flange 25 nicely against the end of the head 12 so that such end will resist any inward movement of the plug and consequent sticking thereof. A packing 40 of any suitable character may be inserted in a recess in the cap 23, as shown in Figure 2 in the drawing.

In accordance with the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim:

1. A chuck operating mechanism including a cylinder comprising a head having a recess therein, a piston within said cylinder, an operating member secured to said piston and extending through an opening in the end of the cylinder, an annular groove in said recess, inlet and exhaust passages communicating with said recess and opening into the chamber in the cylinder on opposite sides of the piston therein, a plug fitting said recess in said head but spaced from the bottom thereof, a passage extending from said space through the plug to the outer end thereof, and a passage extending from said annular groove into said space to drain fluid collected in said groove.

2. A chuck operating mechanism including a cylinder comprising a head having a flat outer end and a recess therein tapering to a smaller dimension at its inner end, a piston within said cylinder, an operating member secured to said piston and extending through the end of the cylinder, inlet and exhaust passages communicating with said recess and opening into the chamber in the cylinder on opposite sides of the piston therein, a plug tapered to fit said recess, inlet and exhaust passages in said plug in communication with the inlet and exhaust passages in said head, and a cap secured to said head in contact with said flat surface on the head and with said plug to retain it in said recess and to provide for taking up wear between said plug and said recess.

3. A chuck operating mechanism including a cylinder comprising a head having a recess therein tapered to a smaller dimension at its inner end, a piston within said cylinder, an operating member secured to said piston and extending through the end of the cylinder, inlet and exhaust passages communicating with said recess and opening into the chamber in the cylinder on opposite sides of the piston therein, a plug tapered to fit said recess, a flange on said plug, inlet and exhaust passages in said plug in communication with the inlet and exhaust passages in said head, and a cap secured to said head and having a lip overlying said flange to retain said plug in said recess.

4. A chuck operating mechanism including a cylinder comprising a head having a recess therein tapered to a smaller dimension at its inner end, a piston within said cylinder, an operating member secured to said piston and extending through the end of the cylinder, inlet and exhaust passages communicating with said recess and opening into the chamber in the cylinder on opposite sides of the piston therein, a plug tapered to fit said recess but spaced from the bottom thereof, inlet and exhaust passages in said plug in communication with the inlet and exhaust passages in said head, the outer end of said head being formed flat to constitute a seat, and a cap secured to said head to retain the plug in place and having a flat inner surface secured in contact with said seat.

5. A chuck operating mechanism including a cylinder comprising a head having a recess therein, a piston within said cylinder, an operating member secured to said piston and extending through an opening in the end of the cylinder, inlet and exhaust passages communicating with said recess and opening into the chamber in the cylinder on opposite sides of the piston therein, a plug fitting said recess in said head, a draining duct extending within the plug from the side thereof to its outer end to remove excess lubricant at this point, inlet and exhaust passages in said plug in communication with said inlet and exhaust passages first mentioned, and means secured to said head to retain the plug in said recess.

GEORGE A. HIGHBERG.
HERBERT HICKEY.